No. 813,676. PATENTED FEB. 27, 1906.
G. M. STADELMAN.
VEHICLE TIRE.
APPLICATION FILED APR. 26, 1904.

Witnesses
C. H. Walker.
J. H. Adams.

Inventor
George Martin Stadelman
By Parsons . Bunch
Attorney

UNITED STATES PATENT OFFICE.

GEORGE MARTIN STADELMAN, OF AKRON, OHIO.

VEHICLE-TIRE.

No. 813,676.

Specification of Letters Patent.

Patented Feb. 27, 1906.

Application filed April 26, 1904. Serial No. 205,010.

*To all whom it may concern:*

Be it known that I, GEORGE MARTIN STADELMAN, a citizen of the United States, residing at Akron, in the county of Summit and State of Ohio, have invented new and useful Improvements in Vehicle-Tires, of which the following is a specification.

This invention relates to improvements in vehicle-tires; and the object is to provide in a cushion-tire guides for the retaining-bands that hold the tire in or upon the rim for the purpose of forcing or guiding said bands inward toward the tire, causing them to cling to the seats or shoulders therefor formed in the tire, whereby the said bands are held in place and prevented from slipping between the tire and flanges of the rim, especially during the twisting and stretching of the tire caused by the wheels encountering or passing over obstructions and inequalities or in making sharp turns.

With the above object in view the invention consists in the novel features of construction hereinafter fully described, particularly pointed out in the claims, and clearly illustrated by the accompanying drawings, in which—

Figure 1:
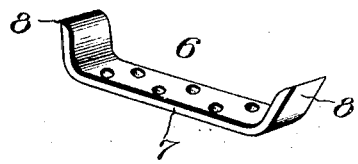
Figure 2:
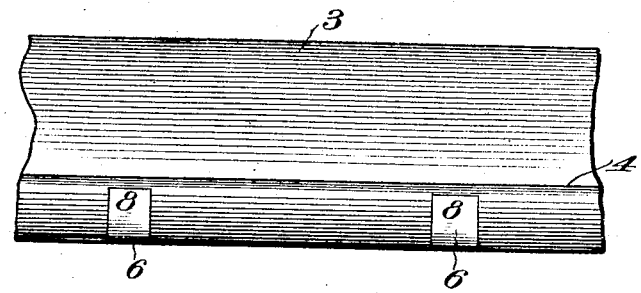
Figure 3:
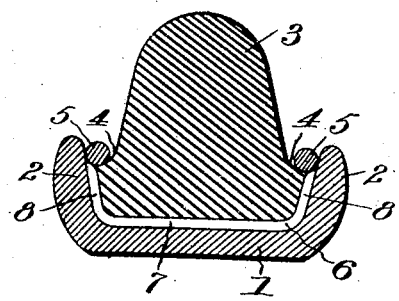

Figure 1 is a perspective view of my improved band-guide removed from the tire; Fig. 2, a side elevation of a portion of a tire provided with my invention; and Fig. 3, a transverse section through the tire and rim, showing my improved band-guides applied to a tire in connection with retaining-bands.

Referring now more particularly to the drawings, 1 designates the rim, having flanges 2 extending about its edge, forming therebetween a seat for the tire 3. Said tire is formed on each side with a circumferentially-extending shoulder 4, which shoulders form seats for the retaining wires or bands 5, which extend therearound and retain the tire in position upon the rim. This construction does not form part of my invention, as it constitutes a common and well-known structure. In this form of tire the retaining-bands 5 frequently slip down between the tire and the flanges of the rim, due to the twisting or stretching of the tire as the vehicle makes sharp turns or in slipping upon stones or in passing over rough roadways, with the result that the tire is very apt to leave the rim. My invention is designed to remove this objectionable feature y the provision of means for holding the bands in close contact with the seats of the tire at all times regardless of the movement of the vehicle, my guides providing an adjustable clench for the tire and preventing the slipping of the bands therefrom.

I provide a number of plates 6, which are preferably molded into the base of the tire, being provided with perforations for causing them to adhere closely to the rubber. Each plate consists of a base portion 7 and end flanges 8, disposed between the sides of the tire and the flanges of the rim. The ends of these flanges 8 terminate in close proximity to the seats 4 of the tire and are preferably inclined inwardly slightly toward said seats. As will be seen, these flanges 8 serve to press the retaining-bands 5 inward upon their seats at all times, causing said bands to adjust themselves to the varying positions of the tire during the different movements of the vehicle.

A distinguishing characteristic of my improvement consists in its avoidance of the interposition of any part or any material part of the metal plates 6 between the retaining-wires and the surfaces of the shoulders 4, on which the wires bear. This enables the wires to contact throughout, or substantially throughout, with the rubber, with the advantage, among other advantages, of a much tighter fit by depression into their seats than if the metal plates 6 were interposed as bearings between the rubber and the wires, and with the further and all-important advantage of adapting the ends of the guide-plates to tend to maintain engagement of the retaining-bands with their seats by positively throwing the endless bands inwardly and downwardly against said seats.

Having thus fully described my invention, what I claim as new, and desire to secure by Letters Patent of the United States, is—

1. In combination with the rim of a vehicle-wheel, a cushioning-tire upon said rim having its sides formed with circumferential retaining-band seats, retaining-bands extending about said seats, and rigid guiding means for said bands at the sides of the tire, unyieldingly supported on said rim and operating to guide said bands inwardly and downwardly against their seats and retain the tire in the rim-channel.

2. In combination with the rim of a vehicle-wheel, a cushioning-tire upon said rim, having a circumferential seat, a retaining-band extending about said seat and contacting with the yielding surface thereof, substantially throughout its circumference, and a plurality of rigid band-guides unyieldingly supported on said rim tending to maintain the engagement of said band with said seat.

3. In combination with the rim of a vehicle-wheel, a cushioning-tire upon said rim, having a circumferential seat, and a plurality of rigid band-guides unyieldingly supported on said rim and tending to maintain the engagement of said band with said seat at the points on the latter which coincide with the ends of said guides.

4. In combination with the rim of a vehicle-wheel, a cushioning-tire upon said rim, having a circumferential seat, a retaining-band extending about said seat, and a plurality of rigid band-guides unyieldingly supported on said rim, said guides terminating at their ends adjacent to the edge of the shoulder of said seat and tending to maintain the engagement of said band with said seat.

5. In combination with the rim of a vehicle-wheel, a cushioning-tire upon said rim formed with a circumferential seat about each side, retaining-bands extending around said seats and each contacting with the yielding surface of its seat substantially throughout the circumference of the latter, and a plurality of rigid band-guides unyieldingly supported on said rim and tending to maintain the engagement of said bands with said seats.

6. In combination with the rim of a vehicle-wheel, a cushioning-tire upon said rim formed with a circumferential seat about each side, retaining-bands extending around said seats, and band-guiding plates formed with end flanges, extending at intervals across the base of the tire with the flanges terminating adjacent to the edges of said seats and tending to maintain engagement of the bands with their seats.

7. In combination with the rim of a vehicle-wheel, a cushioning-tire upon said rim formed with a circumferential seat about each side, retaining-bands extending around said seats, and band-guiding plates molded at intervals into the base of the tire to extend across the same and formed with end flanges terminating adjacent to the edges of said seats and tending to maintain engagement of the bands with their seats.

8. In combination with the rim of a vehicle-wheel, a cushioning-tire upon said rim formed with a circumferential seat about each side, retaining-bands extending around said seats, and band-guiding plates molded at intervals into the base of the tire to extend across the same and formed with end flanges provided with inwardly-inclined extremities terminating adjacent to the edges of said seats and tending to maintain engagement of the bands with their seats.

9. In a vehicle-tire, the combination with a rim of an elastic tire, having a circumferentially-extending seat or shoulder at each side thereof, retaining-bands extending around said seats and band-guides comprising a base portion extending beneath the base of the tire, and side flanges terminating adjacent to the seats, and having their outer ends beveled inwardly toward the seats for causing said bands to cling to said seats.

In testimony whereof I have signed my name to this specification in the presence of two subscribing witnesses.

GEORGE MARTIN STADELMAN.

Witnesses:
 HELEN HINMAN,
 J. H. ADAMS.